(12) United States Patent
Aksu et al.

(10) Patent No.: US 11,200,701 B2
(45) Date of Patent: Dec. 14, 2021

(54) METHOD AND APPARATUS FOR STORAGE AND SIGNALING OF STATIC POINT CLOUD DATA

(71) Applicant: Nokia Technologies Oy, Espoo (FI)

(72) Inventors: Emre Baris Aksu, Tampere (FI); Miska Matias Hannuksela, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/823,438

(22) Filed: Mar. 19, 2020

(65) Prior Publication Data

US 2020/0302650 A1  Sep. 24, 2020

Related U.S. Application Data

(60) Provisional application No. 62/820,628, filed on Mar. 19, 2019.

(51) Int. Cl.
*G06T 9/00* (2006.01)
*H04N 19/70* (2014.01)
(Continued)

(52) U.S. Cl.
CPC ............... *G06T 9/00* (2013.01); *G06T 15/205* (2013.01); *H04N 19/20* (2014.11);
(Continued)

(58) Field of Classification Search
CPC ...... H04N 19/70; H04N 19/20; H04N 19/463; H04N 19/30; G06T 9/00; G06T 2210/56; G06T 15/205
See application file for complete search history.

(56) References Cited

U.S. PATENT DOCUMENTS

2016/0253838 A1*  9/2016  Nguyen ................. G06T 15/08
                                                                345/422
2018/0146225 A1   5/2018  Hannuksela et al.
(Continued)

FOREIGN PATENT DOCUMENTS

WO   WO 2020/012073   1/2020
WO   WO 2020/070379   4/2020

OTHER PUBLICATIONS

*Clarification on PCC Category 2 Bitstream From System Technology Aspect*, ISO/IEC JTC1/SC29/WG11 MPEG2018/M43491 (Jul. 2018) 2 pages.
(Continued)

*Primary Examiner* — Obafemi O Sosanya
(74) *Attorney, Agent, or Firm* — Alston & Bird LLP

(57) ABSTRACT

A method, apparatus and computer program product access a video-based point cloud compression coded bitstream. The point cloud compression coded bitstream corresponds to a non-timed video-based point cloud compression representation that comprises one or more video point cloud compression units. The method, apparatus and computer program product encapsulate the one or more video point cloud compression units as one or more video point cloud compression unit items. The method, apparatus and computer program product also cause storage of the one or more video point cloud compression unit items in a file.

28 Claims, 7 Drawing Sheets

(51) Int. Cl.
  *H04N 19/463* (2014.01)
  *G06T 15/20* (2011.01)
  *H04N 19/20* (2014.01)
  *H04N 19/30* (2014.01)

(52) U.S. Cl.
  CPC ........... *H04N 19/463* (2014.11); *H04N 19/70* (2014.11); *G06T 2210/56* (2013.01); *H04N 19/30* (2014.11)

(56) References Cited

U.S. PATENT DOCUMENTS

| | | | | |
|---|---|---|---|---|
| 2019/0087979 | A1* | 3/2019 | Mammou | G06T 9/001 |
| 2020/0204808 | A1* | 6/2020 | Graziosi | G06K 9/6211 |
| 2020/0296397 | A1* | 9/2020 | Wang | H04N 13/178 |
| 2020/0304508 | A1* | 9/2020 | Bae | H04L 63/102 |

OTHER PUBLICATIONS

*MPEG V-PCC Metadata Random Access in ISOBMFF*, ISO/IEC JTC1/SC29/WG11 MPEG2018/M46044 (Jan. 2019) 5 pages.

*On Carriage of Static V-PCC Content*, ISO/IEC JTC1/SC29/WG11 MPEG2019/M47439 (Mar. 2019) 3 pages.

*Study Text of ISO/IEC CD 23090 5: Video-Based Point Cloud Compression*, ISO/IEC JTC1/SC29WG11 N18180 (Jan. 2019) 103 pages.

Wien, M. et al., *Standardization Status of Immersive Video Coding*, IEEE Journal on Emerging and Selected Topics in Circuits and Systems, vol. 9, No. 1 (Mar. 2019) 5-18.

Information Technology—High Efficiency Coding and Media Delivery in Heterogeneous Environments—Part 12: Image File Format (HEIF, ISO/IEC 23008-12) (Dec. 2017) (82 pages).

Information Technology—Coded Representation of Immersive Media—Part 10: Carriage of Point Cloud Data, ISO 23090-10:2019(E) (2019) 14 pages.

Information Technology—JPEG 2000 Image Coding System—Part 12: ISO Base Media File Format, ISO/IEC JTC 1/SC 29 N, ISO/IEC 15444-12:2015(E) (Feb. 2015) 275 pages.

Information Technology—Coding of Audio-Visual Objects—Part 12: ISO Base Media File Format, ISO/IEC 14496-12 (2005) 94 pages.

Information Technology—Coding of Audio-Visual Objects—Part 12: ISO Base Media File Format, ISO/IEC 14496-12 (Oct. 2008) 120 pages.

Information Technology—Coding of Audio-Visual Objects—Part 14: MP4 File Format, ISO/IEC 14496-14 (Nov. 2003) 18 pages.

Information Technology—Coding of Audio-Visual Objects—Part 15; Advanced Audio Coding (AVC) File Format, ISO/IEC 14496-15 (Apr. 2004) 29 pages.

Information Technology—Coded Representation of Immersive Media—Part 10: Carriage of Visual Volumetric Video-Based Coding Data (ISO/IEC 14496-12), ISO 23090-10:2020(E) (2020) 58 pages.

Extended European Search Report for Application No. 20 16 4094 dated Aug. 14, 2020, 11 pages.

3GPP TS 26.244 V15.0.0, 3$^{rd}$ Generation Partnership Project; Technical Specification Group Services and System Aspects; Transparent End-to-End Packet Switched Streaming Service (PSS); 3GPP File Format (3GP) (Release 15) (Jun. 2018) 67 pages.

* cited by examiner

METHOD AND APPARATUS FOR STORAGE AND SIGNALING OF STATIC POINT CLOUD DATA

CROSS-REFERENCE TO RELATED APPLICATION

This patent application claims priority from U.S. Provisional Patent Application Ser. No. 62/820,628, titled "METHOD AND APPARATUS FOR STORAGE AND SIGNALING OF STATIC POINT CLOUD DATA," filed Mar. 19, 2019, which is incorporated herein by reference in its entirety.

TECHNICAL FIELD

An example embodiment relates generally to volumetric video encoding and decoding.

BACKGROUND

Volumetric video data represents a three-dimensional scene or object and can be used as input for augmented reality (AR), virtual reality (VR) and mixed reality (MR) applications. Such data describes geometry (shape, size, and/or position in three dimensional (3D) space) and respective attributes (e.g. color, opacity, reflectance, etc.), plus temporal changes of the geometry and attributes at given time instances (between frames in two dimensional (2D) video). Volumetric video is either generated from 3D models, e.g., computer-generated imagery (CGI), or captured from real-world scenes using a variety of capture solutions, e.g., multiple cameras, a laser scan, a combination of video and dedicated depth sensors, and more. One example representation format for such volumetric data is point clouds. Temporal information about the scene can be included in the form of individual capture instances, e.g., "frames" in two dimensional (2D) video, or other mechanisms, e.g. the position of an object as a function of time.

Projecting volumetric models onto 2D planes allows for using 2D video coding tools with highly efficient temporal compression. Thus, coding efficiency is increased greatly. Using geometry-projections instead of 2D-video based approaches, e.g., multiview and depth, provide a better coverage of the scene (and/or object). Thus, six degree of freedom (6DOF) capabilities are improved. Using several geometries for individual objects improves the coverage of the scene further. Furthermore, standard video encoding hardware can be utilized for real-time compression/decompression of the projected planes. The projection and reverse projection steps are of relatively low complexity.

A point cloud is a set of points in a 3D space, each with associated data relative to the value of the two angles (phi and theta) used in the acquisition, e.g. color, material properties and/or other attributes. Point clouds can be used to reconstruct an object or a scene as a composition of such points. Point clouds can be captured using multiple cameras and depth sensors in various setups and may be made up of thousands up to billions of points in order to represent realistically reconstructed scenes.

Video-based Point Cloud Compression (V-PCC) addresses lossless and lossy coding of 3D point clouds with associated attributes such as color. By leveraging existing and video ecosystems in general (hardware acceleration, transmission services and infrastructure), and future video codecs as well, the V-PCC technology enables new applications.

V-PCC encoded data can be temporally changing (e.g. volumetric animation) or it could be static (e.g. a 3D captured statue, object, a time instance of the temporally changing V-PCC data, etc.). Currently, only storage of temporally changing V-PCC encoded data is defined. Such storage mechanism is built on utilization of media tracks and metadata tracks, which are designed to carry temporally changing data. However, if there is only one such time instance or if the V-PCC encoded data is static in time, utilization of media tracks is not possible.

BRIEF SUMMARY

A method, apparatus and computer program product are provided in accordance with an example embodiment to signal and store static point cloud data in video encoding. The method, apparatus and computer program product may be utilized in conjunction with a variety of video formats.

In one example embodiment, a method is provided that includes accessing a video point cloud compression coded bitstream. The point cloud compression coded bitstream corresponds to a video point cloud compression representation that comprises one or more video point cloud compression units. The method further includes encapsulating the one or more video point cloud compression units as one or more video point cloud compression unit items. The method further includes causing storage of the one or more video point cloud compression unit items in a file.

In some implementations of such a method, the file further comprises metadata defined to indicate a presence of the one or more video point cloud compression items. In some embodiments, the point cloud compression coded bitstream further comprises one or more item references to indicate a link between one or more video point cloud compression items and the one or more video point cloud compression units or one or more entities containing the video point cloud compression units. In some embodiments, the one or more item references indicate one or more unit types of the one or more video point cloud compression units. In some embodiments, the one or more video point cloud compression unit items are associated with one or more video point cloud compression unit properties that include one or more of: a profile, level and tier information, a maximum number of layers, one or more attributes, one or more attribute types, or one or more maximum resolutions. In some embodiments, the one or more video point cloud compression units are identical in content representation, and wherein a grouping type indicating that the one or more video point cloud compression units are identical in content representation is associated with the one or more video point cloud compression units. In some embodiments, the one or more video point cloud compression unit items are marked as hidden items that are not independently renderable. In some embodiments, the one or more video point cloud compression units are alternatives for content representation, and wherein a grouping type indicating that the one or more video point cloud compression units are alternatives for content representation is associated with the one or more video point cloud compression units.

In another example embodiment, an apparatus is provided that includes processing circuitry and at least one memory including computer program code for one or more programs with the at least one memory and the computer program code configured to, with the processing circuitry, cause the apparatus at least to access a video point cloud compression coded bitstream. The point cloud compression coded bitstream corresponds to a video point cloud compression representation that comprises one or more video point cloud compression units. The computer program code is further configured to, with the at least one processor, cause the apparatus to encapsulate the one or more video point cloud compression units as one or more video point cloud compression unit items. The computer program code is further configured to, with the at least one processor, cause the apparatus to cause storage of the one or more video point cloud compression unit items in a file.

In some implementations of such an apparatus, the file further comprises metadata defined to indicate a presence of the one or more video point cloud compression items. In some embodiments, the point cloud compression coded bitstream further comprises one or more item references to indicate a link between one or more video point cloud compression items and the one or more video point cloud compression units or one or more entities containing the video point cloud compression units. In some embodiments, the one or more item references indicate one or more unit types of the one or more video point cloud compression units. In some embodiments, the one or more video point cloud compression unit items are associated with one or more video point cloud compression unit properties that include one or more of: a profile, level and tier information, a maximum number of layers, one or more attributes, one or more attribute types, or one or more maximum resolutions. In some embodiments, the one or more video point cloud compression units are identical in content representation, and wherein a grouping type indicating that the one or more video point cloud compression units are identical in content representation is associated with the one or more video point cloud compression units. In some embodiments, the one or more video point cloud compression unit items are marked as hidden items that are not independently renderable. In some embodiments, the one or more video point cloud compression units are alternatives for content representation, and wherein a grouping type indicating that the one or more video point cloud compression units are alternatives for content representation is associated with the one or more video point cloud compression units.

In another example embodiment, a computer program product is provided that includes at least one non-transitory computer-readable storage medium having computer executable program code instructions stored therein with the computer executable program code instructions comprising program code instructions configured, upon execution, to access a video point cloud compression coded bitstream. The point cloud compression coded bitstream corresponds to a video point cloud compression representation that comprises one or more video point cloud compression units. The computer executable program code instructions comprise program code instructions are further configured, upon execution, to encapsulate the one or more video point cloud compression units as one or more video point cloud compression unit items. The computer executable program code instructions comprise program code instructions are further configured, upon execution, to cause storage of the one or more video point cloud compression unit items in a file.

In some implementations of such a computer program product, the file further comprises metadata defined to indicate a presence of the one or more video point cloud compression items. In some embodiments, the point cloud compression coded bitstream further comprises one or more item references to indicate a link between one or more video point cloud compression items and the one or more video point cloud compression units or one or more entities containing the video point cloud compression units. In some embodiments, the one or more item references indicate one or more unit types of the one or more video point cloud compression units. In some embodiments, the one or more video point cloud compression unit items are associated with one or more video point cloud compression unit properties that include one or more of: a profile, level and tier information, a maximum number of layers, one or more attributes, one or more attribute types, or one or more maximum resolutions. In some embodiments, the one or more video point cloud compression units are identical in content representation, and wherein a grouping type indicating that the one or more video point cloud compression units are identical in content representation is associated with the one or more video point cloud compression units. In some embodiments, the one or more video point cloud compression unit items are marked as hidden items that are not independently renderable. In some embodiments, the one or more video point cloud compression units are alternatives for content representation, and wherein a grouping type indicating that the one or more video point cloud compression units are alternatives for content representation is associated with the one or more video point cloud compression units.

In another example embodiment, an apparatus is provided that includes means for accessing a video point cloud compression coded bitstream. The point cloud compression coded bitstream corresponds to a video point cloud compression representation that comprises one or more video point cloud compression units. The apparatus further includes means for encapsulating the one or more video point cloud compression units as one or more video point cloud compression unit items. The apparatus further includes means for causing storage of the one or more video point cloud compression unit items in a file.

In some implementations of such an apparatus, the file further comprises metadata defined to indicate a presence of the one or more video point cloud compression items. In some embodiments, the point cloud compression coded bitstream further comprises one or more item references to indicate a link between one or more video point cloud compression items and the one or more video point cloud compression units or one or more entities containing the video point cloud compression units. In some embodiments, the one or more item references indicate one or more unit types of the one or more video point cloud compression units. In some embodiments, the one or more video point cloud compression unit items are associated with one or more video point cloud compression unit properties that include one or more of: a profile, level and tier information, a maximum number of layers, one or more attributes, one or more attribute types, or one or more maximum resolutions. In some embodiments, the one or more video point cloud compression units are identical in content representation, and wherein a grouping type indicating that the one or more video point cloud compression units are identical in content representation is associated with the one or more video point cloud compression units. In some embodiments, the one or more video point cloud compression unit items are marked as hidden items that are not independently renderable. In some embodiments, the one or more video point cloud compression units are alternatives for content representation, and wherein a grouping type indicating that the one or more video point cloud compression units are alternatives for content representation is associated with the one or more video point cloud compression units.

BRIEF DESCRIPTION OF THE DRAWINGS

Figure 1:
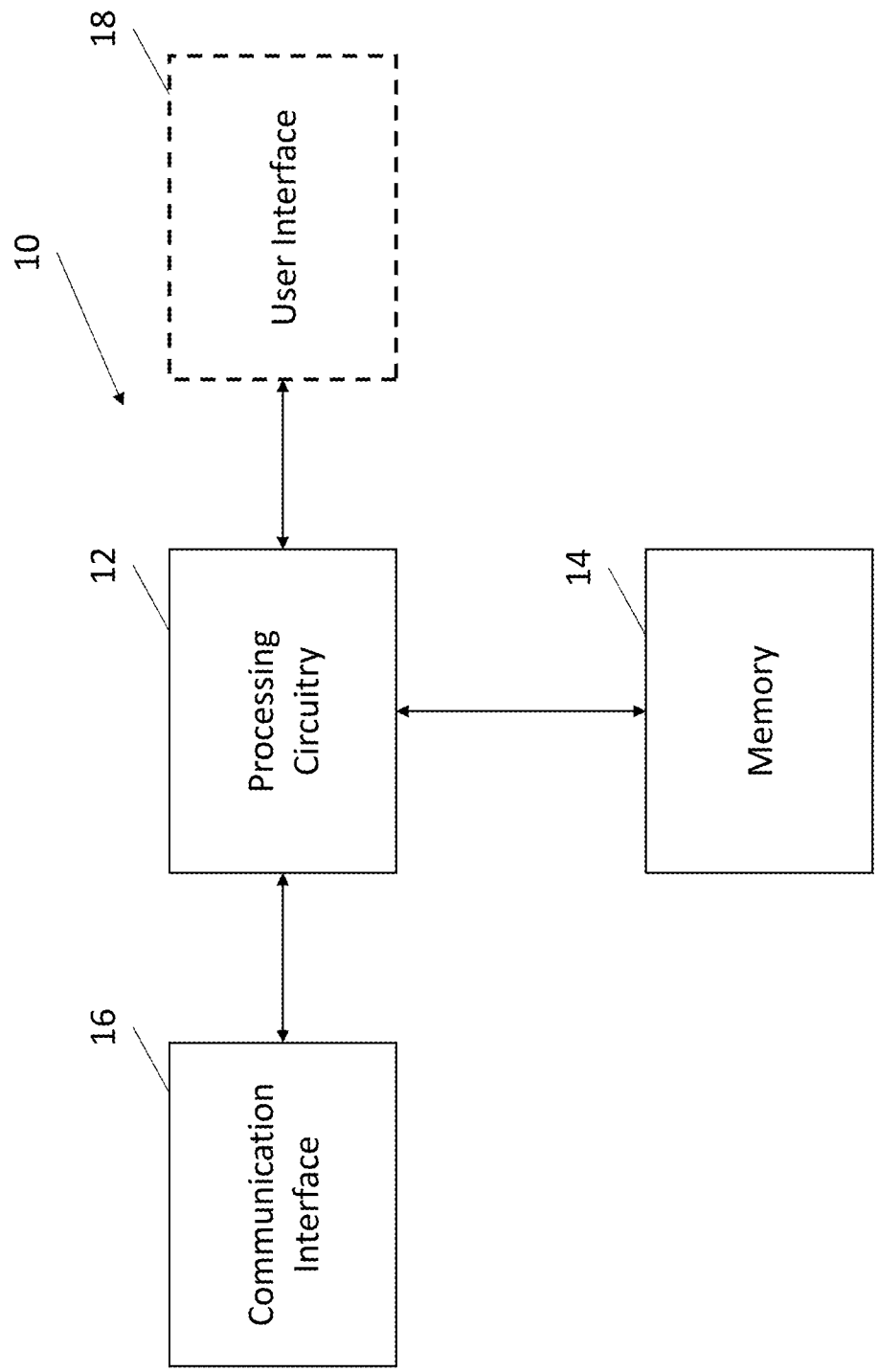
Figure 2:
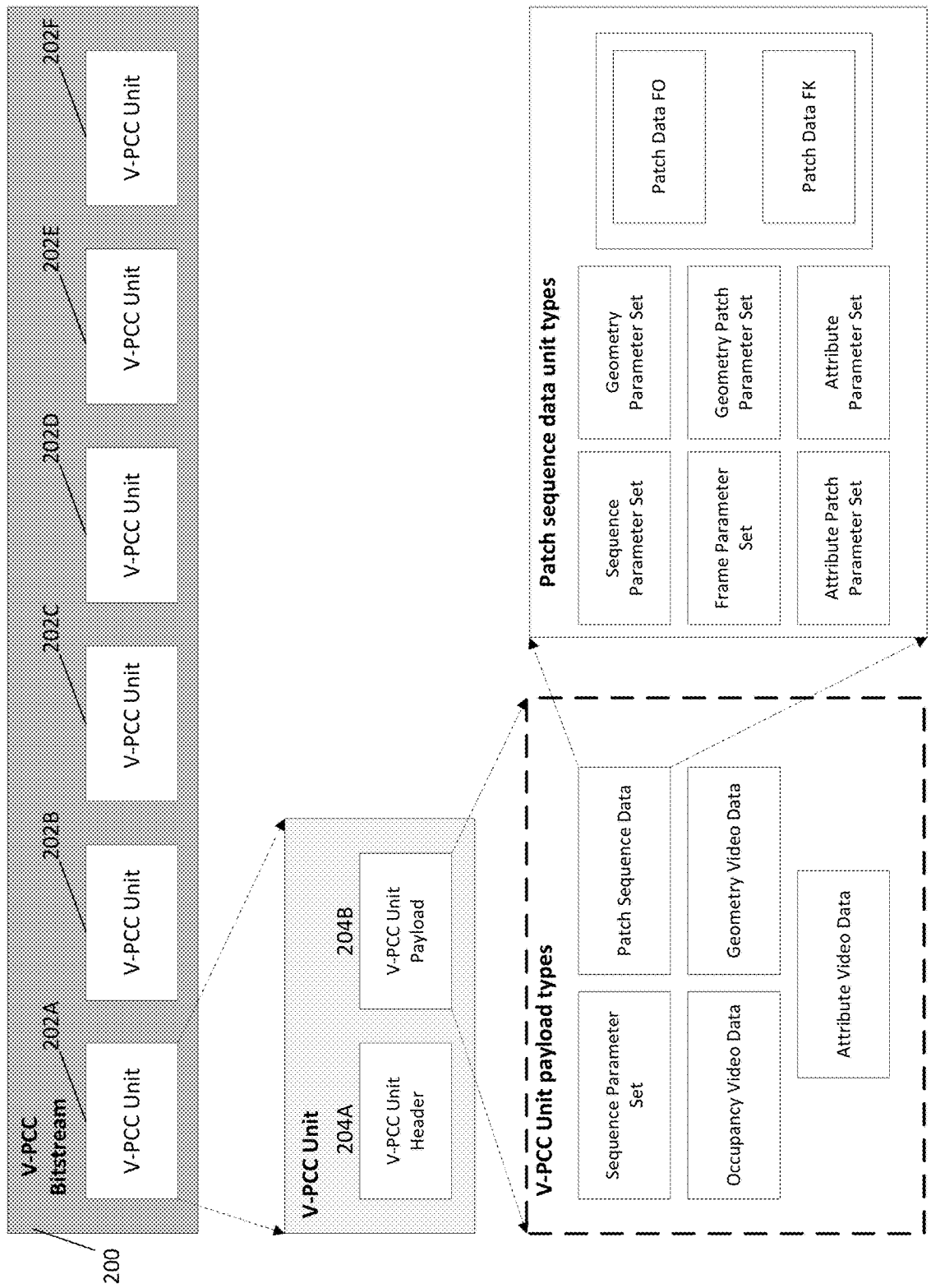
Figure 3:
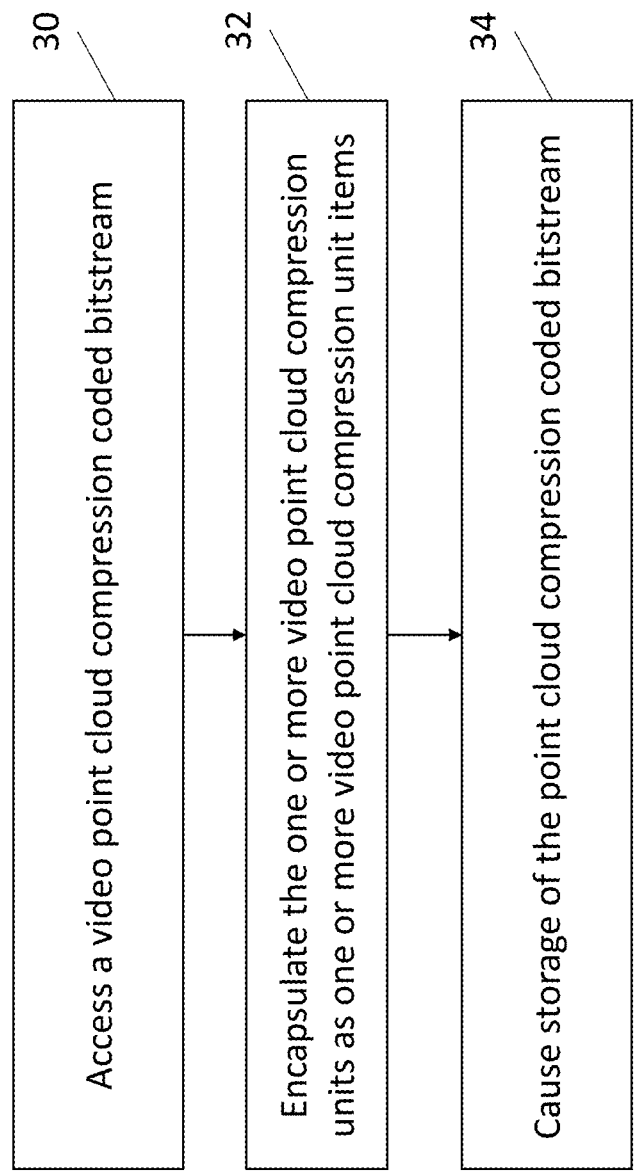

Having thus described certain example embodiments of the present disclosure in general terms, reference will here- inafter be made to the accompanying drawings, which are not necessarily drawn to scale, and wherein:

FIG. 1 is a block diagram of an apparatus that may be specifically configured in accordance with an example embodiment of the present disclosure;

FIG. 2 illustrates the structure of a V-PCC bitstream and V-PCC data in accordance with an example embodiment of the present disclosure;

FIG. 3 is a flowchart illustrating a set of operations performed, such as by the apparatus of FIG. 1, in accordance with an example embodiment of the present disclosure; and FIGS. 4A to 4D provide graphical illustrations of different example structures of V-PCC items in accordance with an example embodiment of the present disclosure.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment to signal and store static point cloud data in video encoding. The method, apparatus and computer program product may be utilized in conjunction with a variety of video formats including High Efficiency Video Coding standard (HEVC or H.265/HEVC), Advanced Video Coding standard (AVC or H.264/AVC), the upcoming Versatile Video Coding standard (VVC or H.266/VVC), and/or with a variety of video and multimedia file formats including International Standards Organization (ISO) base media file format (ISO/IEC 14496-12, which may be abbreviated as ISOBMFF), Moving Picture Experts Group (MPEG)-4 file format (ISO/IEC 14496-14, also known as the MP4 format), and file formats for NAL (Network Abstraction Layer) unit structured video (ISO/IEC 14496-15) and $3^{rd}$ Generation Partnership Project (3GPP file format) (3GPP Technical Specification 26.244, also known as the 3GP format). ISOBMFF is the base for derivation of all the above mentioned file formats. An example embodiment is described in conjunction with the HEVC, however, the present disclosure is not limited to HEVC, but rather the description is given for one possible basis on top of which an example embodiment of the present disclosure may be partly or fully realized.

Some aspects of the disclosure relate to container file formats, such as International Standards Organization (ISO) base media file format (ISO/IEC 14496-12, which may be abbreviated as ISOBMFF), Moving Picture Experts Group (MPEG)-4 file format (ISO/IEC 14496-14, also known as the MP4 format), and file formats for NAL (Network Abstraction Layer) unit structured video (ISO/IEC 14496-15) and $3^{rd}$ Generation Partnership Project (3GPP file format) (3GPP Technical Specification 26.244, also known as the 3GP format). Example embodiments are described in conjunction with the ISOBMFF or its derivatives, however, the present disclosure is not limited to ISOBMFF, but rather the description is given for one possible basis on top of which an example embodiment of the present disclosure may be partly or fully realized.

The High Efficiency Image File Format (HEIF) is a standard developed by the Moving Picture Experts Group (MPEG) for storage of images and image sequences. HEIF includes a rich set of features building on top of the widely used ISO Base Media File Format (ISOBMFF), making HEIF feature-wise superior compared to other image file formats.

A basic building block in the ISO base media file format is called a box. Each box has a header and a payload. The box header indicates the type of the box and the size of the box in terms of bytes. Box type is typically identified by an unsigned 32-bit integer, interpreted as a four character code (4CC). A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

In files conforming to the ISO base media file format, the media data may be provided in one or more instances of MediaDataBox ('mdat') and the MovieBox ('moov') may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks can be collectively called media tracks, and they contain an elementary media stream. Other track types comprise hint tracks and timed metadata tracks.

Tracks comprise samples, such as audio or video frames. For video tracks, a media sample may correspond to a coded picture or an access unit.

A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. A timed metadata track may refer to samples describing referred media and/or hint samples.

The 'trak' box includes in its hierarchy of boxes the SampleDescriptionBox, which gives detailed information about the coding type used, and any initialization information needed for that coding. The SampleDescriptionBox contains an entry-count and as many sample entries as the entry-count indicates. The format of sample entries is track-type specific but derived from generic classes (e.g. VisualSampleEntry, AudioSampleEntry). Which type of sample entry form is used for derivation of the track-type specific sample entry format is determined by the media handler of the track.

The track reference mechanism can be used to associate tracks with each other. The TrackReferenceBox includes box(es), each of which provides a reference from the containing track to a set of other tracks. These references are labeled through the box type (e.g., the four-character code of the box) of the contained box(es).

The ISO Base Media File Format contains three mechanisms for timed metadata that can be associated with particular samples: sample groups, timed metadata tracks, and sample auxiliary information. A derived specification may provide similar functionality with one or more of these three mechanisms.

A sample grouping in the ISO base media file format and its derivatives, such as the advanced video coding (AVC) file format and the scalable video coding (SVC) file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group.

There may be multiple instances of the SampleToGroupBox and SampleGroupDescriptionBox based on different grouping criteria. These may be distinguished by a type field used to indicate the type of grouping. SampleToGroupBox may comprise a grouping typeparameter field that can be used e.g. to indicate a sub-type of the grouping.

In ISOMBFF, an edit list provides a mapping between the presentation timeline and the media timeline. Among other things, an edit list provides for the linear offset of the presentation of samples in a track, provides for the indication of empty times and provides for a particular sample to be dwelled on for a certain period of time. The presentation timeline may be accordingly modified to provide for looping, such as for the looping videos of the various regions of the scene. One example of the box that includes the edit list, the EditListBox, is provided below:

```
aligned(8) class EditListBox extends FullBox('elst', version, flags) {
    unsigned int(32) entry_count;
    for (i=1; i <= entry_count; i++) {
        if (version==1) {
            unsigned int(64) segment_duration;
            int(64) media_time;
        } else { // version==0
            unsigned int(32) segment_duration;
            int(32) media_time;
        }
        int(16) media_rate_integer;
        int(16) media_rate_fraction = 0;
    }
}
```

In ISOBMFF, an EditListBox may be contained in EditBox, which is contained in TrackBox ('trak').

In this example of the edit list box, flags specify the repetition of the edit list. By way of example, setting a specific bit within the box flags (the least significant bit, e.g., flags & 1 in ANSI-C notation, where & indicates a bit-wise AND operation) equal to 0 specifies that the edit list is not repeated, while setting the specific bit (e.g., flags & 1 in ANSI-C notation) equal to 1 specifies that the edit list is repeated. The values of box flags greater than 1 may be defined to be reserved for future extensions. As such, when the edit list box indicates the playback of zero or one samples, (flags & 1) may be equal to zero. When the edit list is repeated, the media at time 0 resulting from the edit list follows immediately the media having the largest time resulting from the edit list such that the edit list is repeated seamlessly.

In ISOBMFF, a Track group enables grouping of tracks based on certain characteristics or the tracks within a group have a particular relationship. Track grouping, however, does not allow any image items in the group.

The syntax of TrackGroupBox in ISOBMFF is as follows:

```
aligned(8) class TrackGroupBox extends Box('trgr') {
}
aligned(8) class TrackGroupTypeBox(unsigned int(32) track_group_type) extends
FullBox(tmck_group_type, version = 0, flags = 0)
{
    unsigned int(32) track_group_id;
    // the remaining data may be specified for a particular track_group_type
}
``` track_group_type indicates the grouping_type and may be set to one of the following values, or a value registered, or a value from a derived specification or registration. 'msrc' indicates that this track belongs to a multi-source presentation. The tracks that have the same value of track_group_id within a TrackGroupTypeBox of track_group_type 'msrc' are mapped as being originated from the same source. For example, a recording of a video telephony call may have both audio and video for both participants, and the value of track_group_id associated with the audio track and the video track of one participant differs from value of track_group_id associated with the tracks of the other participant. The pair of track_group_id and track_group_type identifies a track group within the file. The tracks that contain a particular TrackGroupTypeBox having the same value of track_group_id and track_group_type belong to the same track group.

The Entity grouping is similar to track grouping but enables grouping of both tracks and items (e.g. image items) in the same group.

The Entity grouping is similar to track grouping but enables grouping of both tracks and image items in the same group. The syntax of EntityToGroupBox in ISOBMFF is as follows:

```
aligned(8) class EntityToGroupBox(grouping_type, version, flags)
extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
}
``` group_id is a non-negative integer assigned to the particular grouping that may not be equal to any group_id value of any other EntityToGroupBox, any item_ID value of the hierarchy level (file, movie. or track) that contains the GroupsListBox, or any track_ID value (when the GroupsListBox is contained in the file level). num_entities_in_group specifies the number of entity_id values mapped to this entity group. entity_id is resolved to an item, when an item with item_ID equal to entity_id is present in the hierarchy level (file, movie or track) that contains the GroupsListBox, or to a track, when a track with track_ID equal to entity_id is present and the GroupsListBox is contained in the file level.

Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a HandlerBox ('hdlr') box indicating the structure or format of the 'meta' box contents. The meta box may list and characterize any number of items that can be referred and each one of them can be associated with a file name and are uniquely identified with the filef by item identifier (item_id) which is an integer value. The metadata items may be for example stored in the Item Data Box ('idat') box of the meta box or in an 'mdat' box or reside in a separate file. If the metadata is located external to the file then its location may be declared by the DataInformationBox (four-character code: 'dinf'). In the specific case that the metadata is formatted using eXtensible Markup Language (XML) syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource. The resource can be formed by concatenating the extents. The ItemPropertiesBox enables the association of any item with an ordered set of item properties. Item properties may be regarded as small data records. The ItemPropertiesBox consists of two parts: ItemPropertyContainerBox that contains an implicitly indexed list of item properties, and one or more ItemPropertyAssociationBox(es) that associate items with item properties.

High Efficiency Image File Format (HEIF) is a standard developed by the Moving Picture Experts Group (MPEG) for storage of images and image sequences. Among other things, the standard facilitates file encapsulation of data coded according to the High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises still images that are stored as items and image sequences that are stored as tracks.

In the context of HEIF, the following boxes may be contained within the root-level 'meta' box and may be used as described in the following. In HEIF, the handler value of the Handler box of the 'meta' box is 'pict'. The resource (whether within the same file, or in an external file identified by a uniform resource identifier) containing the coded media data is resolved through the Data Information ('dinf) box, whereas the Item Location ('iloc') box stores the position and sizes of every item within the referenced file. The Item Reference ('iref) box documents relationships between items using typed referencing. If there is an item among a collection of items that is in some way to be considered the most important compared to others then this item is signaled by the Primary Item ('pitm') box. Apart from the boxes mentioned here, the 'meta' box is also flexible to include other boxes that may be necessary to describe items.

Any number of image items can be included in the same file. Given a collection of images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with an auxiliary image such as an alpha plane. A cover image among the collection of images is indicated using the 'pitm' box. A thumbnail image or an auxiliary image is linked to the primary image item using an item reference of type 'thmb' or 'auxl', respectively.

Regardless of the file format of the video bitstream, the apparatus of an example embodiment may be provided by any of a wide variety of computing devices including, for example, a video encoder, a video decoder, a computer workstation, a server or the like, or by any of various mobile computing devices, such as a mobile terminal, e.g., a smartphone, a tablet computer, a video game player, or the like.

Regardless of the computing device that embodies the apparatus, the apparatus 10 of an example embodiment includes, is associated with or is otherwise in communication with processing circuitry 12, a memory 14, a communication interface 16 and optionally, a user interface 18 as shown in FIG. 1.

The processing circuitry 12 may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 16 may be any means such as a device or circuitry embodied in either hardware or a combination of hardware and software that is configured to receive and/or transmit data, including video bitstreams. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 10 is configured to encode the video bitstream, the apparatus 10 may optionally include a user interface 18 that may, in turn, be in communication with the processing circuitry 12 to provide output to a user, such as by outputting an encoded video bitstream and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device 14, and/or the like).

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO base media file format, a file includes media data and metadata that are encapsulated into boxes. Each box is identified by a four character code (4CC) and starts with a header which informs about the type and size of the box. Content related meta data is stored in "meta" boxes inside an ISOBMFF file. Such a box may be present at file level, track level or both.

When describing HEVC and in certain example embodiments, common notation for arithmetic operators, logical operators, relation operators, bit-wise operators, assignment operators, and range notation e.g., as specified in HEVC may be used. Furthermore, common mathematical functions e.g., as specified in HEVC may be used and a common order or precedence and execution order (from left to right or from right to left) of operators e.g., as specified in HEVC may be used.

When describing example embodiments that utilize HEVC, only the relevant parts of syntax structures are included in the description of the syntax and semantics. However, other embodiments could be realized similarly with a different order and names of syntax elements.

When describing example embodiments, the term file is sometimes used as a synonym of syntax structure or an instance of a syntax structure. In other contexts, the term file may be used to mean a computer file, that is a resource forming a standalone unit in storage.

When describing ISOBMFF and example embodiments, a syntax structure may be specified as described below. A group of statements enclosed in curly brackets is a compound statement and is treated functionally as a single statement. A "while" structure specifies a test of whether a condition is true, and if true, specifies evaluation of a statement (or compound statement) repeatedly until the condition is no longer true. A "do . . . while" structure specifies evaluation of a statement once, followed by a test of whether a condition is true, and if true, specifies repeated evaluation of the statement until the condition is no longer true. An "if . . . else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true. 4CC codes for different syntax structures may be provided by way of example.

Volumetric video data represents a three-dimensional scene or object and can be used as input for AR, VR and MR applications. Such data describes geometry (shape, size and position in 3D-space) and respective attributes (e.g. color, opacity, reflectance, etc.), plus any possible temporal changes of the geometry and attributes at given time instances (like frames in 2D video). Volumetric video is either generated from 3D models, e.g., CGI, or captured from real-world scenes using a variety of capture solutions, e.g., multi-camera, laser scan, a combination of video and dedicated depth sensors, and more. Also, a combination of CGI and real-world data is possible. Typical representation formats for such volumetric data are triangle meshes, point clouds, or voxels. Temporal information about the scene can be included in the form of individual capture instances, e.g., "frames" in 2D video, or other mechanisms, e.g., position of an object as a function of time.

Because volumetric video represents a 3D scene (or object), such data can be viewed from any viewpoint. Therefore, volumetric video is a useful format for any AR, VR, or MR applications, especially for providing 6DOF viewing capabilities.

Increasing computational resources and advances in 3D data acquisition devices have enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense Voxel arrays have been used to represent volumetric medical data. In 3D graphics, polygonal meshes are extensively used. Point clouds on the other hand are well suited for applications such as capturing real world 3D scenes where the topology is not necessarily a 2D manifold. Another way to represent 3D data is coding the 3D data as a set of texture and depth maps as is the case in multi-view plus depth. Closely related to the techniques used in multi-view plus depth is the use of elevation maps, and multi-level surface maps.

In dense point clouds or voxel arrays, the reconstructed 3D scene may contain tens or even hundreds of millions of points. If such representations need to be stored or interchanged between computing entities, efficient compression becomes essential. Standard volumetric video representation formats, such as point clouds, meshes and voxels, suffer from poor temporal compression performance. Identifying correspondences for motion-compensation in 3D-space is an ill-defined problem, as both geometry and respective attributes may change. For example, temporal successive "frames" do not necessarily have the same number of meshes, points or voxels. Therefore, compression of dynamic 3D scenes is inefficient. 2D-video based approaches for compressing volumetric data, e.g., multiview and depth, have much better compression efficiency, but rarely cover the full scene. Therefore, they provide only limited 6DOF capabilities.

Because of the limitations of the two approaches mentioned above, a third approach is developed. A 3D scene, represented as meshes, points, and/or voxels, can be projected onto one, or more, geometries. These geometries are "unfolded" onto 2D planes (two planes per geometry: one for texture, one for depth), which are then encoded using standard 2D video compression technologies. Relevant projection geometry information is transmitted alongside the encoded video files to the decoder. The decoder decodes the video and performs the inverse projection to regenerate the 3D scene in any desired representation format (not necessarily the encoding format).

Projecting volumetric models onto 2D planes allows for using 2D video coding tools with highly efficient temporal compression. Thus, coding efficiency is increased greatly. Using geometry-projections instead of 2D-video based approaches, e.g., multiview and depth, provide a better coverage of the scene (and/or object). Thus, 6DOF capabilities are improved. Using several geometries for individual objects improves the coverage of the scene further. Furthermore, standard video encoding hardware can be utilized for real-time compression/decompression of the projected planes. The projection and reverse projection operations are of relatively low complexity.

A point cloud is a set of points in a 3D space each with associated data relative to the value of the two angles (phi and theta) used in the acquisition, e.g. color, material properties and/or other attributes. Point clouds can be used to reconstruct an object or a scene as a composition of such points. Point clouds can be captured using multiple cameras and depth sensors in various setups and may be made up of thousands up to billions of points in order to represent realistically reconstructed scenes.

Video-based Point Cloud Compression (V-PCC) addresses lossless and lossy coding of 3D point clouds with associated attributes such as color. By leveraging existing and video ecosystems in general (hardware acceleration, transmission services and infrastructure), and future video codecs as well, the V-PCC technology enables new applications. V-PCC data is comprised of V-PCC units. Such units are comprised of V-PCC unit headers and V-PCC unit payloads. FIG. 2 illustrates the structure of a V-PCC bitstream and V-PCC data. As illustrated in FIG. 2, V-PCC bitstream 200 include one or more V-PCC units 202A to 202F. Each of the V-PCC units include a V-PCC unit header 204A and a V-PCC unit payload 204B. Each unit contains a different V-PCC unit payload. The payload may take the form of a sequence parameter set, patch sequence data, occupancy video data, geometry video data, or attribute video data. Patch sequence data may take the form of a sequence parameter set, geometry parameter set, geometry patch parameter set, frame parameter set, attribute parameter set, or attribute patch parameter set. The following table provides example V-PCC bitstream syntax and structure.

| vpcc_unit_type | Identifier | V-PCC Unit Type | Description |
|---|---|---|---|
| 0 | VPCC_SPS | Sequence parameter set | Sequence level parameters |
| 1 | VPCC_PSD | Patch Sequence Data | Patch sequence information |
| 2 | VPCC_OVD | Occupancy Video Data | Occupancy information |
| 3 | VPCC_GVD | Geometry Video Data | Geometry information |
| 4 | VPCC_AVD | Attribute Video Data | Attribute information |
| 5 . . . 31 | VPCC_RSVD | Reserved | — |

V-PCC units are serialized in time. MPEG initiated a work on defining the storage mechanism for V-PCC encoded data. Such data is comprised of storage of multiple video encoded bitstreams and V-PCC representation related non-video encoded data and metadata. Example embodiments are described in conjunction with V-PCC storage mechanism described in the MPEG N18059 or its derivatives, however, the present disclosure is not limited to MPEG N18059, but rather the description is given for one possible basis on top of which an example embodiment of the present disclosure may be partly or fully realized.

V-PCC encoded data can be temporally changing (e.g. volumetric animation) or it could be static (e.g. a 3D captured statue, object, a time instance of the temporally changing V-PCC data). Currently, only storage of temporally changing V-PCC encoded data is defined in MPEG standardization. Such storage mechanism is built on utilization of media tracks and metadata tracks, which are designed to carry temporally changing data. Static encoded data refers to independently decodable "frame" of a V-PCC encoded bitstream which can be viewed as static in time.

However, if there is only one such time instance or if the V-PCC encoded data is static in time, utilization of media tracks is not possible. There is a need for a mechanism to signal and store static 3D representations that are V-PCC coded.

Referring now to FIG. 3, the operations performed, such as by an encoder embodied by the apparatus 10 of FIG. 1, in order to signal and store static 3D representations that are V-PCC coded in accordance with an example embodiment are depicted. As shown in block 30, the apparatus includes means, such as the processing circuitry 12, for accessing a video point cloud compression coded bitstream. As shown in block 32, the apparatus includes means, such as the processing circuitry 12, for encapsulating the one or more video point cloud compression units as one or more video point cloud compression unit items. As shown in block 34, the apparatus includes means, such as the processing circuitry 12 and the memory 14, for causing storage of the one or more video point cloud compression unit items in a file.

Examples of the point cloud compression items that are compatible with ISOBMFF, by way of example, are provided below. In some embodiments, a new item type called "V-PCC item" may be defined. A 4CC item type of V-PCC item may be defined as 'vpci'. This item may be analogous to the V-PCC bitstream. In some embodiments, a new item type named, by way of example, "V-PCC unit item" is defined. A 4CC item type of V-PCC unit items may be defined as "vpcu". Each V-PCC unit item may store a single or multiple V-PCC units with vpcc_unit-types. FIGS. 4A to 4D provide graphical illustrations of different example structures of V-PCC items. In some embodiments, such items may contain only V-PCC unit payloads without the V-PCC unit headers. In such a case, each V-PCC unit item may be referenced by a different item reference type per V-PCC unit type. Examples include 'peps', 'pcpa', 'pcpg', and 'pcpo' for V-PCC units of data type VPCC_SPS, VPCC_AVD, VPCC_GVD and VPCC_OVD respectively.

In some embodiments, such V-PCC unit payloads may be encapsulated into another data structure. An example of such a data structure is provided below:

```
aligned(8) class vpcc_unit_payload_struct ( ) {
    unsigned int(16) vpcc_unit_payload_size;
    vpcc_unit_payload( );
}
``` vpcc_unit_payload size is the size in bytes of the vpcc_unit_payload( ) and vpcc_unit_payload( ) is as defined in the V-PCC specification In some embodiments, V-PCC samples may be encapsulated in a similar way in a different data structure.

In some embodiments, V-PCC sample entries and V-PCC sample group entries may contain one or multiple vpcc_unit_payload struct( )s as defined above.

Figure 4A:
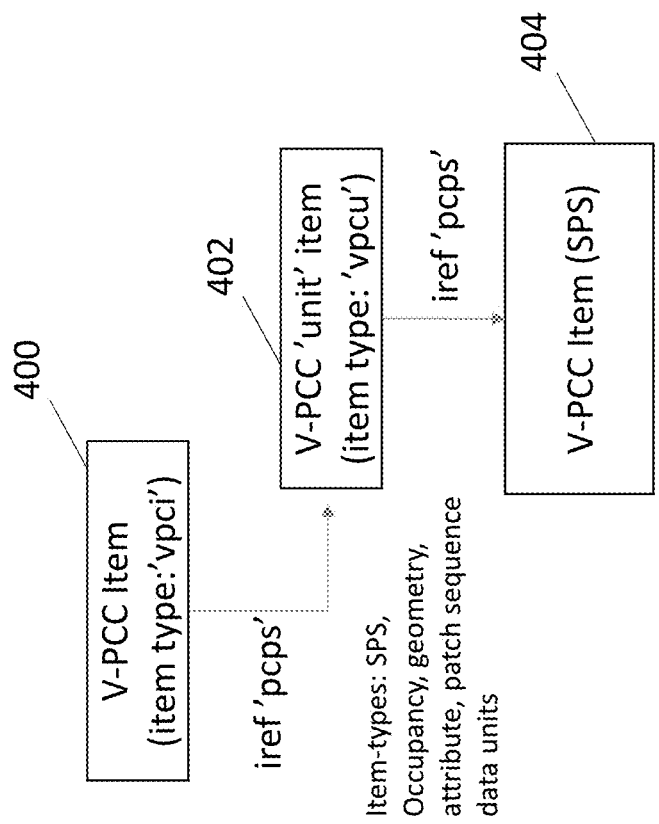

A new item reference type may be defined to link the V-PCC unit items 402 in FIG. 4A to the V-PCC item 400. A 4CC code of this reference type may be "pcps". Item reference boxCiref) as defined in ISOBMFF is utilized to carry this information. Reference direction may be from the V-PCC item towards the V-PCC unit items or vice versa. In some embodiments, V-PCC unit items may carry V-PCC units of type VPCC_SPS and may be linked to the relevant VPCC units via above-defined "pcps" item reference (404 in FIG. 4A), or "cdsc" item reference as defined in ISOBMFF or any other item reference which could be defined in the scope of this embodiment. In some embodiments, for video encoded V-PCC units and pulse code modulation (PCM) or lossless video encoded V-PCC units, the corresponding V-PCC unit items may have associated properties which contain decoder specific information such as decoder specific information that is required to configure the related decoder. For H.265 and H.264, such boxes may take the form of an HEVCConfigurationBox and an AVCConfigurationBox respectively as defined in ISO/IEC 14496-15.

In some embodiments, a PCMVideoConfigurationBox may be defined for PCM video encoded V-PCC units, layers or patches. Such a PCMVideoConfigurationBox may be stored in a property of a relevant V-PCC unit item. This box may contain the decoder specific information of the PCM encoding as well as representation properties (e.g. byte precision, sample size, sample scalar range, etc.) of each PCM video sample or pixel.

In some embodiments, all parameter sets in a V-PCC bitstream are indexed. In some embodiments, the V-PCC units are processed in the order that they are defined in the V-PCC bitstream so that all parameter set identifiers (ids) are consistent and parameter sets would be processed before their related V-PCC units. In addition, it is beneficial to have a 'registry' of each item type for a fast V-PCC decode & render pipeline setup. To enable such a consistency and such a registry, by way of example, a new box called VPCC-GroupBox( ) which extends from the Entity2GroupBox may be defined to indicate the item types and processing orders of the V-PCC unit items. The order of entities in the VPCCGroupBox indicates the decoding order. The first entity in the list may correspond to a V-PCC item. In some embodiments, if SPSs are also stored as V-PCC items, then the following VPCCGroupBox may be utilized in the EntityToGroupBox to provide high level information about the V-PCC representation. An example VPCCGroupBox is provided below:

```
aligned(8) class VPCCGroupBox( )
extends EntityToGroupBox('vpcg', version, flags) {
    unsigned int(1) global_SPS_params_present_flag
    unsigned int(7) reserved = 0;
        if (global_SPS_params_present_flag == 1) {
                    unsigned int(1) tier_flag;
            unsigned int(7) profile_idc;
            unsigned int(8) level_idc;
            unsigned int(16) attribute_count;
            unsigned int(4) layer_count_minus1;
            unsigned int(4) reserved = 0;
    } else {
        unsigned int(40) reserved =0;
        }
    for(i=0; i< num_entities_in_group; i++){ //may start from 1 to bypass first entity entry which may be a V-PCC Item
            unsigned int(5) data_type[i];
            unsigned int(3) reserved;
            if(data_type[i] == 0){ // VPCC_SPS
              if (global_SPS_params_present_flag == 0){
                        unsigned int(1) tier_flag;
                        unsigned int(7) profile_idc;
                        unsigned int(8) level_idc;
                unsigned int(16) attribute_count;
                unsigned int(4) layer_count_minus1;
                unsigned int(4) reserved =0;
                    } else {
                    unsigned int(40) reserved =0;
                    }
            } else if(data_type[i] == 2){ //VPCC_GVD
                unsigned int(4) min_layer_id[i];
                unsigned int(4) max_layer_id[i];
                unsigned int(32) reserved = 0;
            } else if (data_type[i] == 4){ //VPCC_AVD
                unsigned int(4) attribute_type[i];
                unsigned int(7) attribute_index[i];
                unsigned int(5) reserved = 0;
                unsigned int(4) min_layer_id[i];
                unsigned int(4) max_layer_id[i];
                unsigned int(16) reserved = 0;
            } else {
                unsigned int(40) reserved = 0;
            }
        }
}
``` global_SPS_params_present_flag indicates that all V-PCC units of type VPCC_SPS carry the same values for tier, profile, level, attribute count and layer count. tier_flag may have the same semantic as ptl_tier_flag defined in the MPEG V-PCC bitstream syntax. ptl_tier_flag specifies the tier context for the interpretation of ptl_level_idc.

profile_idc may have the same semantic as ptl_profile_idc defined in the MPEG V-PCC bitstream syntax. ptl_profile_idc indicates a profile to which a coded point cloud sequence (CPCS) conforms.

level_idc may have the same semantic as ptl_level_idc defined in the MPEG V-PCC bitstream syntax. ptl_level_idc indicates a level to which the CPCS conforms.

attribute_count may have the same semantic as sps_attribute_count defined in the MPEG V-PCC bitstream syntax. sps_attribute_count indicates the number of attributes associated with the point cloud.

layer_count_minus1 may have the same semantic as sps_layer_count_minus1 defined in the MPEG V-PCC bitstream syntax. min_layer_id[i] indicates the minimum layer index present in related V-PCC entity defined in the MPEG V-PCC bitstream syntax. Layer index has the same semantics as vpcc_layer_index. max_layer id[i] indicates the maximum layer index present in the related V-PCC entity defined in the MPEG V-PCC bitstream syntax. Layer index has the same semantics as vpcc_layer_index. attribute_type[i] may have the same semantics as aps_attribute_type_id[i] defined in the MPEG V-PCC bitstream syntax. attribute_index[i] has the same semantics as vpcc_attribute_index defined in the MPEG V-PCC bitstream syntax. data_type[i] may have the same semantics as vpcc_unit_type defined in MPEG V-PCC bitstream syntax.

In some embodiments, a V-PCC item/track may have a data_type value which is bigger than or equal to 32 or smaller than or equal to −1. All other values may map one-to-one to vpcc_unit_type values semantically as previously defined.

In some embodiments, the first indexed entity may correspond to a V-PCC item. In such a case, the first indexed entity may be skipped (e.g., 'i' may start from 1 instead of 0 as the first index).

In some embodiments, if multiple V-PCC units are stored in the same V-PCC unit item, those V-PCC units may be of the same vpcc_unit_type and may additionally include a VPCC_SPS unit type. This box provides the order of the V-PCC units and how they should be processed to decode a V-PCC item.

When the first entity in this list is a V-PCC item, a playback device comprising a decoder may be able to parse the entity that indicates that the box contents belong to a V-PCC item and start processing the metadata and V-PCC unit items accordingly.

In some embodiments, average frame rate (sps_svg_frame_rate), frame width (sps_frame_width) and frame height (sps_frame_height) information may be listed as SPS parameters in the VPCCGroupBox as defined in the MPEG V-PCC bitstream syntax.

In some embodiments, the above-defined entity grouping may also apply when grouped entities are media tracks which carry V-PCC encoded data.

In some embodiments, the VPCCGroupBox may have the following structure and syntax as another example:

| vpcc_unit_type | Identifier | V-PCC Unit Type | Description |
| --- | --- | --- | --- |
| 0 | VPCC_SPS | Reserved | — |
| 1 | VPCC_PSD | Patch Sequence Data | Patch sequence information |
| 2 | VPCC_OVD | Occupancy Video Data | Occupancy information |
| 3 | VPCC_GVD | Geometry Video Data | Geometry information |
| 4 | VPCC_AVD | Attribute Video Data | Attribute information |
| 5 . . . 31 | VPCC_RSVD | Reserved | — | attribute_type[i] may have the same semantics as attribute_type in the V-PCC specification.

Attribute types as specified in the V-PCC specification are provided below:

| aps_attribute_type_id[i] | Identifier | Attribute type |
| --- | --- | --- |
| 0 | ATTR_TEXTURE | Texture |
| 1 | ATTR_MATERIAL_ID | Material ID |
| 2 | ATTR_TRANSPARENCY | Transparency |
| 3 | ATTR_REFLECTANCE | Reflectance |
| 4 | ATTR_NORMAL | Normals |

```
aligned(8) class VPCCGroupBox( ) extends EntityToGroupBox('vpcg', version, flags) {
vpcc_profile_tier_level(64) //defined in V-PCC spec
    unsigned int(4) max_layer_count_minus1;
    unsigned int(4)reserved = 0;
        unsigned int(16) max_attribute_count;
for(i=0; i<num_entities_in_group; i++){
        unsigned int(5) data_type[i];
        unsigned int(3) reserved;
    if(data_type[i] == 3){
    unsigned int(4) layer_id[i];
    unsigned int(20) reserved = 0;
    } else if (data_type[i] == 4){
        unsigned int(4) attribute_type[i];
    unsigned int(4) layer_id[i];
    unsigned int(16) attribute_index[i];
    } else {
        unsigned int(24) reserved = 0;
}
}
}
}
```

In some embodiments, vpcc_profile_tier_level( ) is the same as profile_tier_level( ) specified in sequence_parameter_set( ) in the MPEG V-PCC bitstream syntax. max_layer_count_minus1 indicates the maximum number of layers for the geometry/attribute information. max_layer_count_minus1 could be in the range of 0 to 15, inclusive and in consecutive order. max_attribute_count indicates the maximum number of attributes associated with the point cloud. max_attribute_count could be in the range of 0 to 65535, inclusive. data_type[i] indicates the type of the V-PCC data in the referenced track as listed in the table below. In an example embodiment, the value of data_type[i] is in the range of 1 to 4, inclusive. layer_id[i] specifies the layer identifier for the associated geometry/attribute video track. The set layer_id values for the referenced V-PCC restricted video scheme type, when sps_multiple_layer_streams_present_flag equals 0, could be in a range from 0 to layer_count_minus1, inclusive. If sps_multiple_layer_streams_present_flag equals 1, layer_id[i] can be discarded as the track contains all layers from 0 to max_layer_count_minus1, inclusive.

-continued

| aps_attribute_type_id[i] | Identifier | Attribute type |
| --- | --- | --- |
| 5 . . . 14 | ATTR_RESERVED | Reserved |
| 15 | ATTR_UNSPECIFIED | Unspecified | attribute_index[i] specifies an attribute identifier for the associated attribute video track.

In some embodiments, new entity grouping types may be defined to indicate further properties for alternation: 1) A new entity grouping of type may be defined to indicate whether listed entities are identical in content representations. A 4CC code of 'pccc' may be defined for such entity grouping. Entities grouped under the 'pccc' entity grouping may represent the same V-PCC content. 2) A new alternate grouping mechanism may be defined to indicate entities which are alternatives of each other, as well as the reason for the alternation may be defined. An example of such an entity grouping is provided below:

```
aligned(8) class AlternateGroupv2( )
    extends EntityToGroupBox('altr', version==2, flags) {
        unsigned int(32) alternation_4CC;
}
``` alternation_4CC may indicate the reason for the alternate grouping such as different bit rates, different resolutions, same content but different properties, different encoding, or the like. Each such alternation may be enumerated as a 4CC code. In some embodiments, a new entity grouping type such as 'alt2' may be defined to indicate such an alternate grouping with alternation description. Such an alternation may be defined for any type of entities such as V-PCC tracks, media tracks or items.

Figure 4B:
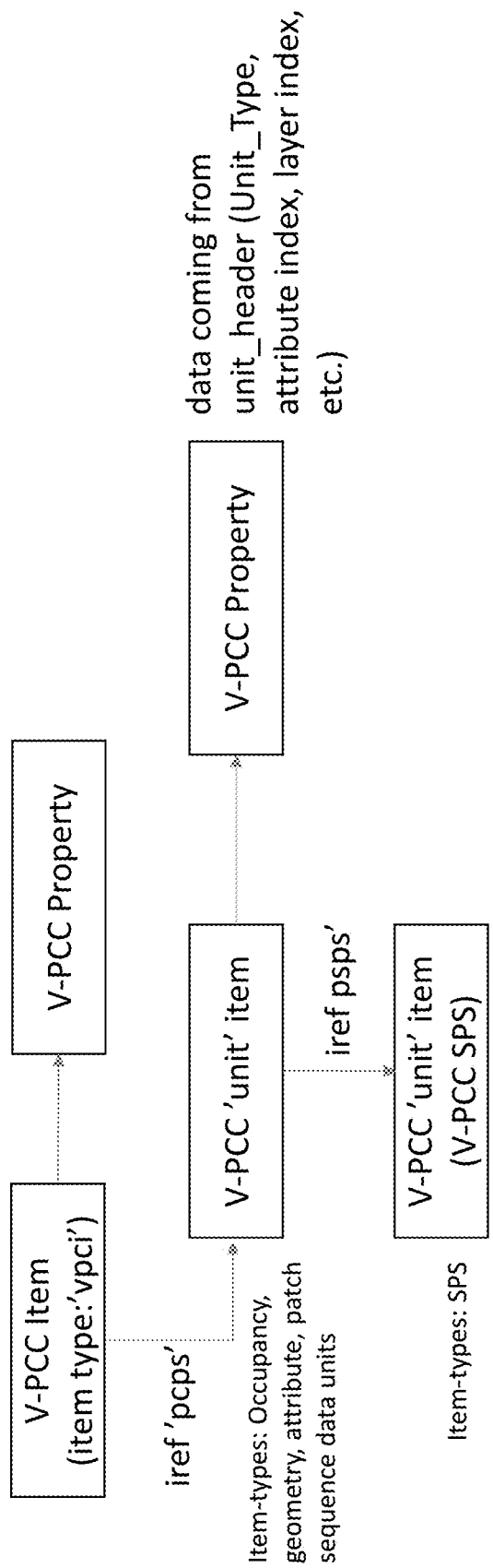

FIG. 4B illustrates an alternative structure of the point cloud compression unit items according to some embodiments of the present disclosure. In these embodiments, each V-PCC unit item may have a different item reference type which may indicate the type of the V-PCC unit item. As an example, a V-PCC unit item of type 'vpcu' that contains a V-PCC unit of type VPCC_SPS may have an item reference of type 'psps' from a V-PCC unit item to the V-PCC unit item of type SPS. In some embodiments, analogously, each V-PCC unit item may have a different item reference type to indicate the relationship of the V-PCC unit item to the V-PCC item.

A V-PCC property may be defined to carry the information in the relevant V-PCC unit header. Such information may be unit type, attribute index, layer index, sequence_parameter_set_id or any other relevant information to decode the V-PCC unit represented by the V-PCC unit item. In an embodiment, a V-PCC item may also have an associated V-PCC Property. Such a property may include the profile, level and tier information, maximum number of layers, attributes, attribute types, maximum resolution or similar representation level information. VPCCGroupBox as previously defined may be utilized to indicate the processing order of V-PCC unit items.

In another embodiment, when a V-PCC unit item contains a unit of type VPCC_AVD, VPCC_GVD_and VPCC_OVD_and contains a video_data_unit( ) as defined by the MPEG syntax, the V-PCC header information may be stored as a new V-PCC Property and then associated with the relevant V-PCC unit item where the item data would be composed of video_data_unit( ) In another embodiment, such a VPCC-unit header data may be stored as another item and linked to the appropriate V-PCC unit item via iref item referencing. In another embodiment, such a property definition and association may be applied to any V-PCC unit item of any type. In an embodiment, vpcc_unit_header information may be stored as a blob of data, or it may be utilized as a syntactically equivalent data structure as defined by the V-PCC unit header syntax as defined in Information technology—Coded Representation of Immersive Media—Part 5: Video-based Point Cloud Compression of ISO/IEC 23090-5:2019. An example 4CC code for such V-PCC property may be defined as 'vuhp' (V-PCC unit header property) or 'vupr' (V-PCC unit property).

Figure 4C:
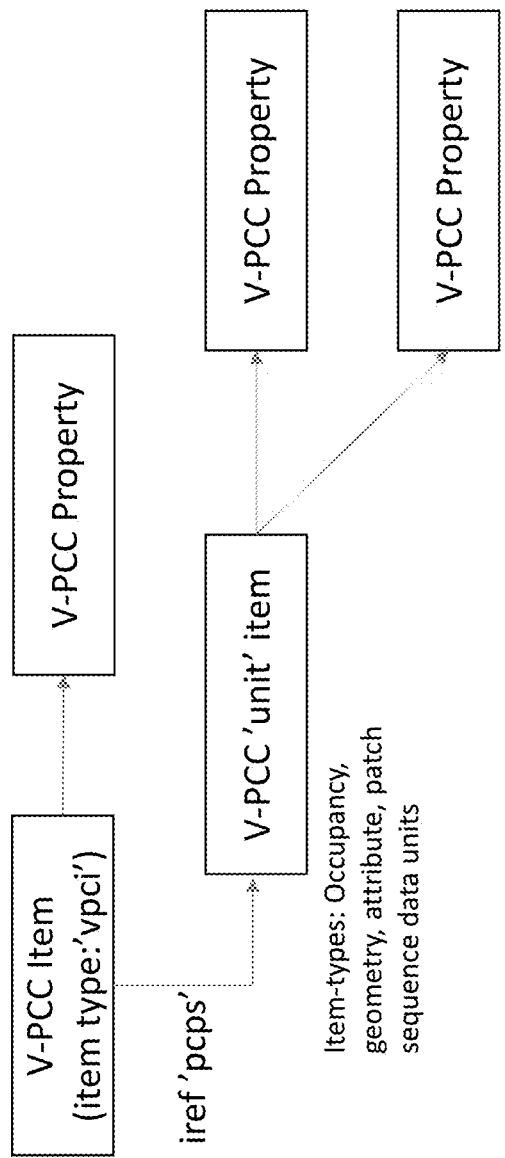

FIG. 4C illustrates another alternative structure of the point cloud compression unit items according to some embodiments of the present disclosure. In the embodiments illustrated in FIG. 4C, V-PCC units of type 'vpcc' SPS may be stored as essential or descriptive item properties. In such a case, each V-PCC unit item which uses a particular V-PCC SPS may be associated with this property using the property association mechanism of ISOBMFF. Such a property may be assigned to both the V-PCC item as well as other relevant V-PCC unit items. VPCCGroupBox as previously defined may be utilized to indicate the processing order of V-PCC unit items.

Figure 4D:
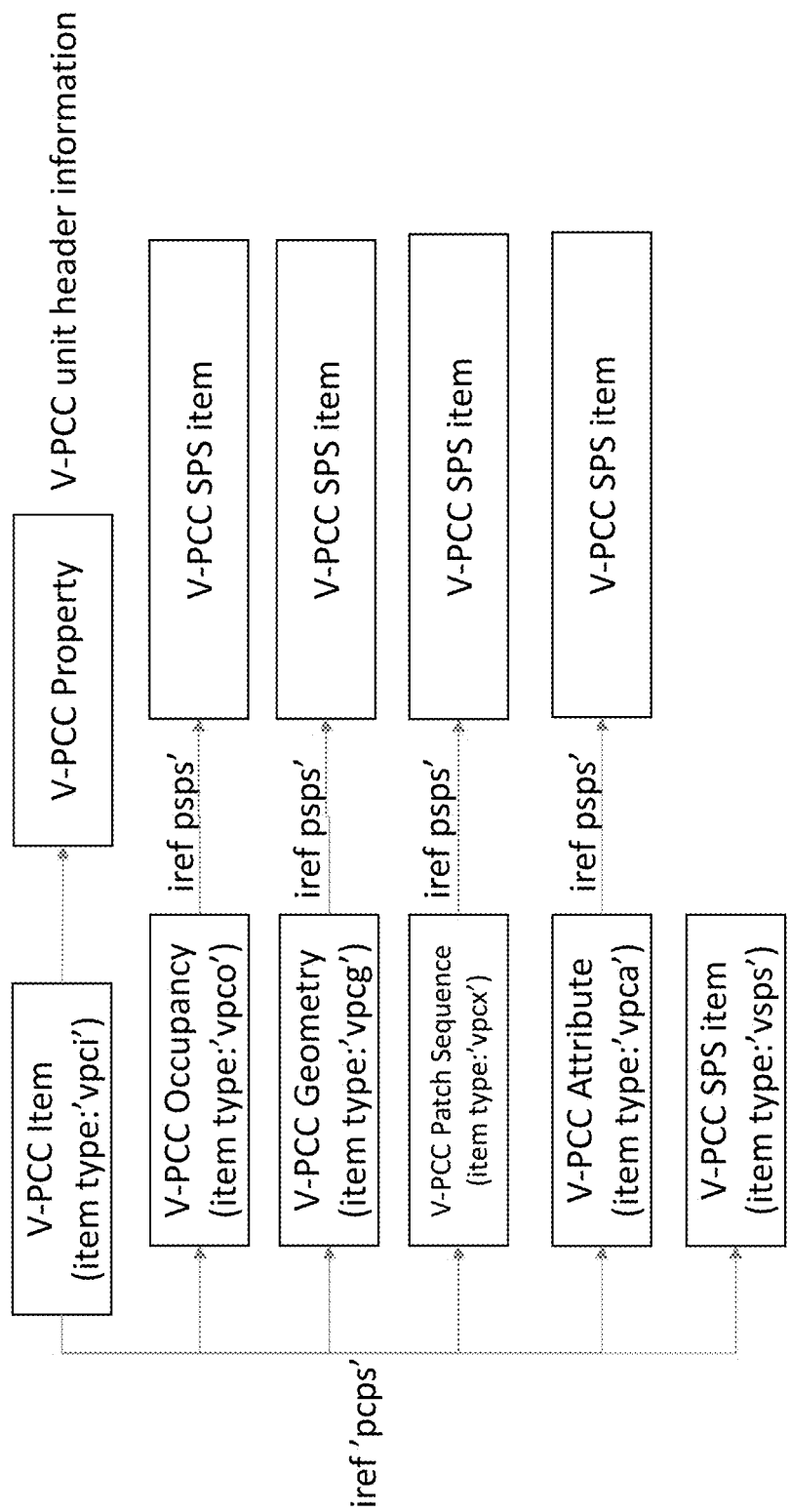

FIG. 4D illustrates another alternative structure of the point cloud compression unit items according to some embodiments of the present disclosure. In the embodiments illustrated in FIG. 4D, all V-PCC unit types are reflected to each V-PCC unit item type. For example, V-PCC units of type occupancy, geometry, attribute, patch sequence and SPS may have V-PCC unit item types 'vpco', 'vpcg', 'vpca', 'cpvx' and 'vsps' respectively. All item references may be of the same type as previously defined (iref of type 'peps' as an example). In some embodiments, all item references may also have dedicated types per V-PCC unit item type. V-PCC SPS units may be stored as V-PCC SPS items as previously described in conjunction with FIG. 4A or V-PCC SPS units may be stored as V-PCC properties as previously defined. In some embodiments, 'cdsc' item references may be utilized instead of the above-mentioned item references between the V-PCC unit items and V-PCC unit items of type SPS.

In some embodiments, a V-PCC item may not be defined. All V-PCC unit items which form a V-PCC static representation may be listed in the EntityToGroupBox as a group, with relevant metadata information.

In some embodiments, the order of the item references listed in the 'iref' box may indicate the processing order of V-PCC unit items. In the description provided above, processing order and decoding order can be used interchangeably.

In some embodiments, all V-PCC units inside the V-PCC bitstream may be stored as a single V-PCC item without any V-PCC unit item definitions. Several V-PCC item specific properties may be defined as a V-PCC property which could be associated with a V-PCC item. Based on this embodiment, a player would process the V-PCC bitstream as it is stored, such as in the decoding order of the V-PCC units.

In some embodiments, a V-PCC item may store a subset of the V-PCC unit items internally. For example, V-PCC patch sequence data, occupancy data or geometry data may be stored inside the V-PCC item as item data. Any non-video encoded data may be stored as item data for the V-PCC item.

In some embodiments, the items which comprise V-PCC related data unit information and are linked to the V-PCC Item may be marked as hidden items and hence not renderable independently. One exmaple method for signaling such information is to use flags of ItemInfoEntry Box. When (flags & 1) is equal to 1 in the ItemInfoEntry, file readers should not display such an item independently and hence it becomes a hidden V-PCC item. In some embodiments, V-PCC unit items and V-PCC items use the same carriage format specifics, hence be logically and semantically equivalent. In some embodiments, the V-PCC Property may also contain the entirety or parts of the patch sequence parameter sets.

In some embodiments, such as when a V-PCC unit item contains a unit of type VPCC_AVD, VPCC_GVD_and VPCC_OVD_and contains a video_data_unit( ) as defined in the MPEG V-PCC Study for CD document, then the V-PCC header information may be stored as a new V-PCC Property and then associated with the relevant V-PCC unit item where the item data would be composed of video_data_unit( ) In another embodiment, such a VPCC-unit header data may be stored as another item and linked to the appropriate V-PCC unit item via iref item referencing. In another embodiment, such a property definition and association may be applied to any V-PCC unit item of any type.

In some embodiments, vpcc_unit_header information may be stored as a blob of data, or it may be utilized as a syntactically equivalent data structure as defined on the V-PCC unit header syntax as defined by Information technology—Coded Representation of Immersive Media—Part 5: Video-based Point Cloud Compression of ISO/IEC 23090-5:2019.

An example 4CC code for such V-PCC property may be defined as 'vuhp' (V-PCC unit header property) or 'vupr' (V-PCC unit property). These names are given as examples and other names may, instead, be utilized in other embodiments.

In some embodiments, Polygon File Format (PLY) or Object (OBJ) type of static 3D objects may be stored in the 'meta' box as static 3D representations. In such a case, a new item type such as "vply" or "vobj" may be defined to indicate that stored data is PLY or OBJ data. Such configuration related information may be stored as item properties for such item types. These items may be referenced by one or more V-PCC items.

In the above, where the example embodiments have been described with reference to syntax and semantics, certain embodiments likewise include an encoder that outputs a bitstream portion according to the syntax and semantics. Likewise, certain embodiments correspondingly cover a decoder that decodes a bitstream portion according to the syntax and semantics.

By way of example, a decoder may be configured to receive the file comprising the encapsulated video point cloud compression coded bitstream and one or more video point cloud compression unit items as previous described in conjunction with FIG. 3. The decoder may be further configured to decode the file comprising the encapsulated bitstream and one or more video point cloud compression unit items. The decoder may be further configured to cause rendering of the encapsulated bitstream and one or more video point cloud compression unit items.

An example embodiment of the invention described above describes the codec in terms of separate encoder and decoder apparatuses in order to assist the understanding of the processes involved. However, it would be appreciated that the apparatus, structures and operations may be implemented as a single encoder-decoder apparatus/structure/operation. Furthermore, it is possible that the encoder and decoder may share some or all common elements.

Although the above examples describe certain embodiments performed by a codec embodied by an apparatus, it would be appreciated that other embodiments may be implemented as part of any video codec. Thus, for example, certain embodiments may be implemented in a video codec which may implement video coding over fixed or wired communication paths.

As described above, FIG. 3 is a flowchart of an apparatus 10, method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by processing circuitry 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart of FIG. 3. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
accessing a video-based point cloud compression coded bitstream, wherein the point cloud compression coded bitstream corresponds to a video point cloud compression representation that comprises one or more static video point cloud compression units;
encapsulating the one or more static video point cloud compression units as one or more video point cloud compression unit items; and
causing storage of the one or more video point cloud compression unit items and the one or more static video point cloud compression units in a file as non-timed video-based point cloud compression coded items, wherein the one or more video point cloud compression items and the one or more static video point cloud compression units are stored in International Standards Organization base media file format.

2. The method according to claim 1, wherein the file further comprises metadata defined to indicate a presence of the one or more non-timed video-based point cloud compression coded items, and wherein the one or more non-timed video-based point cloud compression coded items are independently decodable.

3. The method according to claim 1, wherein the point cloud compression coded bitstream further comprises one or more item references to indicate a link between one or more video point cloud compression items and at least one of the following: the one or more video point cloud compression unit items or one or more entities containing the one or more static video point cloud compression units.

4. The method according to claim 3, wherein the one or more item references indicate one or more unit types of the one or more static video point cloud compression units, said one or more unit types comprising one or more of: occupancy, geometry, attribute, patch sequence, or sequence parameter set.

5. The method according to claim 1, wherein the one or more video-based point cloud compression (V-PCC) coded items or coded unit items are further associated with one or more video point cloud compression unit properties that include one or more of: profile, level and tier information, a maximum number of layers, one or more attributes, one or more attribute types, or one or more maximum resolutions.

6. The method according to claim 1, wherein the one or more static video point cloud compression units are identical in content representation so as to represent a same video point cloud compression unit content, and wherein a grouping type indicating that the one or more static video point cloud compression units are identical in content representation is associated with the one or more static video point cloud compression units.

7. The method according to claim 1, wherein the one or more video point cloud compression unit items are marked as hidden items that are not independently renderable by setting a flag in an ItemInfoEntry Box.

8. The method according to claim 1, wherein the one or more static video point cloud compression units are alternatives for content representation, and wherein a grouping type indicating that the one or more static video point cloud compression units are alternatives for content representation is associated with the one or more static video point cloud compression units.

9. An apparatus comprising at least one processor and at least one memory including computer program code for one or more programs, the at least one memory and the computer program code configured to, with the at least one processor, cause the apparatus at least to:
access a video-based point cloud compression coded bitstream, wherein the point cloud compression coded bitstream corresponds to a video point cloud compression representation that comprises one or more static video point cloud compression units;
encapsulate the one or more static video point cloud compression units as one or more video point cloud compression unit items; and
cause storage of the one or more video point cloud compression unit items and the one or more static video point cloud compression units in a file as non-timed video-based point cloud compression coded items, wherein the one or more video point cloud compression items and the one or more static video point cloud compression units are stored in International Standards Organization base media file format.

10. The apparatus according to claim 9, wherein the file further comprises metadata defined to indicate a presence of the one or more non-timed video-based point cloud compression coded items, and wherein the one or more non-timed video-based point cloud compression coded items are independently decodable.

11. The apparatus according to claim 9, wherein the point cloud compression coded bitstream further comprises one or more item references to indicate a link between one or more video point cloud compression items and one or more of the following: the one or more video point cloud compression unit items or one or more entities containing the one or more static video point cloud compression units.

12. The apparatus according to claim 11, wherein the one or more item references indicate one or more unit types of the one or more static video point cloud compression units, said one or more unit types comprising one or more of: occupancy, geometry, attribute, patch sequence, or sequence parameter set.

13. The apparatus to claim 9, wherein the one or more video-based point cloud compression (V-PCC) coded items or coded unit items are further associated with one or more video point cloud compression unit properties that include one or more of: profile, level and tier information, a maximum number of layers, one or more attributes, one or more attribute types, or one or more maximum resolutions.

14. The apparatus according to claim 9, wherein the one or more static video point cloud compression units are identical in content representation so as to represent a same video point cloud compression unit content, and wherein a grouping type indicating that the one or more static video point cloud compression units are identical in content representation is associated with the one or more static video point cloud compression units.

15. The apparatus according to claim 9, wherein the one or more static video point cloud compression units are alternatives for content representation, and wherein a grouping type indicating that the one or more static video point cloud compression units are alternatives for content representation is associated with the one or more static video point cloud compression units.

16. The apparatus according to claim 9, wherein the one or more video point cloud compression unit items are marked as hidden items that are not independently renderable by setting a flag in an ItemInfoEntry Box.

17. A computer program product comprises at least one non-transitory computer-readable storage medium having computer executable program code instructions stored therein, the computer executable program code instructions comprising program code instructions configured, upon execution, to:
- access a video-based point cloud compression coded bitstream, wherein the point cloud compression coded bitstream corresponds to a video point cloud compression representation that comprises one or more static video point cloud compression units;
- encapsulate the one or more static video point cloud compression units as one or more video point cloud compression unit items; and
- cause storage of the one or more video point cloud compression unit items and the one or more static video point cloud compression units in a file as non-timed video-based point cloud compression coded items, wherein the one or more video point cloud compression items and the one or more static video point cloud compression units are stored in International Standards Organization base media file format.

18. The computer program product according to claim 17, wherein the file further comprises metadata defined to indicate a presence of the one or more non-timed video-based point cloud compression coded items, and wherein the one or more non-timed video-based point cloud compression coded items are independently decodable.

19. The computer program product according to claim 17, wherein the point cloud compression coded bitstream further comprises one or more item references to indicate a link between one or more video point cloud compression items and the one or more static video point cloud compression units or one or more entities containing the video point cloud compression units.

20. The computer program product according to claim 19, wherein the one or more item references indicate one or more unit types of the one or more static video point cloud compression units, said one or more unit types comprising one or more of: occupancy, geometry, attribute, patch sequence, or sequence parameter set.

21. The method according to claim 1, wherein the one or more video point cloud compression unit items are stored at a file level or a movie level.

22. The method according to claim 1, wherein the one or more video point cloud compression unit items are stored in a meta box.

23. The apparatus according to claim 9, wherein the one or more video point cloud compression unit items are stored at a file level or a movie level.

24. The apparatus according to claim 9, wherein the one or more video point cloud compression unit items are stored in a meta box.

25. The computer program according to claim 19, wherein the one or more video point cloud compression unit items are stored at a file level or a movie level.

26. The computer program according to claim 19, wherein the one or more video point cloud compression unit items are stored in a meta box.

27. The method of claim 4, wherein the one or more unit types are associated with one or more unit item types of vpco, vpcg, vpca, cpvx, and vsps, respectively.

28. The method of claim 27, wherein the item references have a type selected from among: item reference (iref), pcps, or cdsc.

* * * * *

UNITED STATES PATENT AND TRADEMARK OFFICE
CERTIFICATE OF CORRECTION

PATENT NO. : 11,200,701 B2
APPLICATION NO. : 16/823438
DATED : December 14, 2021
INVENTOR(S) : Aksu et al.

Page 1 of 1

It is certified that error appears in the above-identified patent and that said Letters Patent is hereby corrected as shown below:

In the Claims

Column 25,
Line 31, "items or" should read --items, or--.

Column 26,
Line 31, "items or" should read --items, or--.

Signed and Sealed this
Fifteenth Day of November, 2022

Katherine Kelly Vidal
*Director of the United States Patent and Trademark Office*